Patented June 19, 1928.

1,673,804

UNITED STATES PATENT OFFICE.

ELMER ANSON DANIELS, OF BERWYN, AND HARRY STIRLING SNELL, OF CHICAGO, ILLINOIS, ASSIGNORS TO WESTERN ELECTRIC COMPANY, INCORPORATED, OF NEW YORK, N. Y., A CORPORATION OF NEW YORK.

HARDENING RESINOUS EXUDATIONS WITH AN ALDEHYDE.

No Drawing. Application filed August 21, 1924. Serial No. 733,443.

This invention relates to improved compositions of matter and methods of producing the same.

Objects of the invention are to produce an improved composition of matter having a resinous exudation as its base and to provide a method for producing the improved composition.

According to the main features of the invention, a resinous exudation, preferably shellac, is treated with aldehyde ammonia in such a manner as to cause a condensation between the aldehyde ammonia and shellac, the result of the reaction being a compound which is resistant to the ordinary solvents and which will not soften appreciably at temperatures considerably above that at which the resinous exudation begins to soften.

The aldehyde ammonia and shellac may be combined in a number of ways and the reaction brought about in the presence of varying degrees of heat. A specific method, however, which has been found to give good results is to dissolve the shellac in alcohol and then add thereto about 1% of aldehyde ammonia. The alcohol is then removed by evaporation and the solid residue subjected to sufficient heat to cause a condensation of the shellac and aldehyde ammonia.

Although good results are obtainable by the use of aldehyde ammonia, other compounds may be employed such as furfuramide, the compound produced by the reaction of formaldehyde and diphenylguanidine and other compounds formed from the combination of an aldehyde and a compound containing a basic nitrogen group.

A hardened shellac produced in the manner described above may be used advantageously with fillers, such as wood flour or asbestos flour to produce an improved molding compound. In this case the composition is produced by dissolving the shellac in alcohol, adding the aldehyde ammonia thereto and then incorporating therewith a sufficient amount of filler to produce the type of composition desired. The alcohol is then removed by evaporation and the composition in the form of a dry powder is subjected to heat and pressure to form the article and cause a cure of the shellac binder.

A solution of shellac and aldehyde ammonia in alcohol may be of particular advantage when used in the form of a paint, such as the shellac solutions which are generally used for waterproofing and protection of patterns which are used in the molding of sand cores and the like. The shellac which has been heretofore used in this type of work softens and becomes tacky when exposed to elevated temperatures. A shellac solution such as that described above may be used for waterproofing in this manner, and the elevated temperature instead of causing a softening of the shellac film will produce a condensation of the shellac and aldehyde ammonia incorporated therewith to produce a film of a high melting point condensation product.

Hardened resinous exudations, such as the hardened shellac which constitutes one embodiment of the present invention, are of very great value in the production of improved molding compounds. An example of a molding composition in which hardened shellac is incorporated is as follows: The shellac is dissolved in a suitable solvent, for example alcohol, the hardener in suitable amounts added thereto, and the entire mixture incorporated with wood flour, the amount of wood flour used depending upon the properties desired in the finished product. A suitable mixture comprising these ingredients which when completed can be employed as a substitute for wood or other materials, may have the following proportions: Shellac, 50 pounds; denatured alcohol, 15 gallons; aldehyde ammonia, 0.5 pounds; and wood flour, 300 pounds. After all the ingredients have been incorporated in the mixture it is agitated until thorough dispersion takes place, is then spread out and thoroughly dried to remove the last trace of alcohol. The residue, after the evaporation of the alcohol, is a dry powder which can be molded by heat and pressure into whatever article is desired. The molding operation may be carried on in various ways, but good results are obtained by employing a pressure of 2000 pounds per square inch for about ten minutes at a temperature of about 250° F. After heating, the composition is allowed to cool in the mold until the articles can be conveniently handled.

A hardened shellac composition such as the one described herein may be employed as the binding material in the improved cork composition described in our co-pending application, Serial No. 724,950, filed July 9, 1924.

What is claimed is:

1. A composition of matter formed by the condensation of a resinous exudation and aldehyde ammonia.

2. A composition of matter formed by the condensation of shellac and aldehyde ammonia.

3. A method of hardening a resinous exudation, which consists in adding aldehyde ammonia thereto and heating.

4. A method of hardening a resinous exudation, which consists in adding the aldehyde ammonia thereto, and then subjecting the resulting mixture to heat and pressure.

5. A method of hardening shellac, which consists in adding aldehyde ammonia thereto, and heating.

6. A method of hardening shellac, which consists in adding aldehyde ammonia thereto, and then subjecting the resulting mixture to heat and pressure.

In witness whereof, we hereunto subscribe our names this 16 day of August A. D., 1924.

ELMER ANSON DANIELS.
HARRY STIRLING SNELL.